United States Patent [19]

Viola

[11] Patent Number: 4,718,118

[45] Date of Patent: Jan. 5, 1988

[54] TRANSPARENT LASER DRIVE CURRENT UPDATE FOR BURST MODE FIBER OPTIC COMMUNICATION SYSTEM

[75] Inventor: Jeffrey P. Viola, Brookhaven, Pa.

[73] Assignee: RCA Corporation, Princeton, N.J.

[21] Appl. No.: 832,532

[22] Filed: Feb. 24, 1986

[51] Int. Cl.$^4$ ............................................... H04B 9/00
[52] U.S. Cl. ................................. 455/613; 455/607; 455/618
[58] Field of Search ............... 455/613, 606, 607, 617, 455/618; 372/31, 38, 26, 28; 370/3, 4, 455

[56] References Cited

U.S. PATENT DOCUMENTS

| | | | |
|---|---|---|---|
| 4,009,385 | 2/1977 | Sell | 250/199 |
| 4,019,048 | 4/1977 | Maione et al. | 250/199 |
| 4,355,395 | 10/1982 | Salter et al. | 372/38 |
| 4,385,387 | 5/1983 | Trimmel | 372/29 |
| 4,523,089 | 6/1985 | Maeda et al. | 250/205 |
| 4,558,465 | 12/1985 | Siegel et al. | 455/609 |
| 4,580,044 | 4/1986 | Hongo et al. | 372/31 |
| 4,592,057 | 5/1986 | Comerford | 372/8 |
| 4,612,617 | 9/1986 | Giles | 455/609 |

Primary Examiner—Robert L. Griffin
Assistant Examiner—Leslie Van Beek
Attorney, Agent, or Firm—Clement A. Berard, Jr.; William H. Meise

[57] ABSTRACT

A burst mode fiber optic or light-wave communication system uses as a transmitter a light emitting device requiring drive current to produce a light output. The characteristics of the light emitting device change with time, so the drive current must be periodically adjusted. In a high speed burst data system, the magnitude of the light output and the new value of drive current cannot be determined until a time well after the beginning of the burst, or possibly after the burst has ended. If the drive current is adjusted to a new value during burst transmission, the change in light output may be interpreted by a receiver as a data transition, which may result in data errors. The change in the control signal which controls the magnitude of the drive signal is delayed until a time between data bursts, whereby the drive current magnitude remains constant during any burst transmission.

12 Claims, 12 Drawing Figures

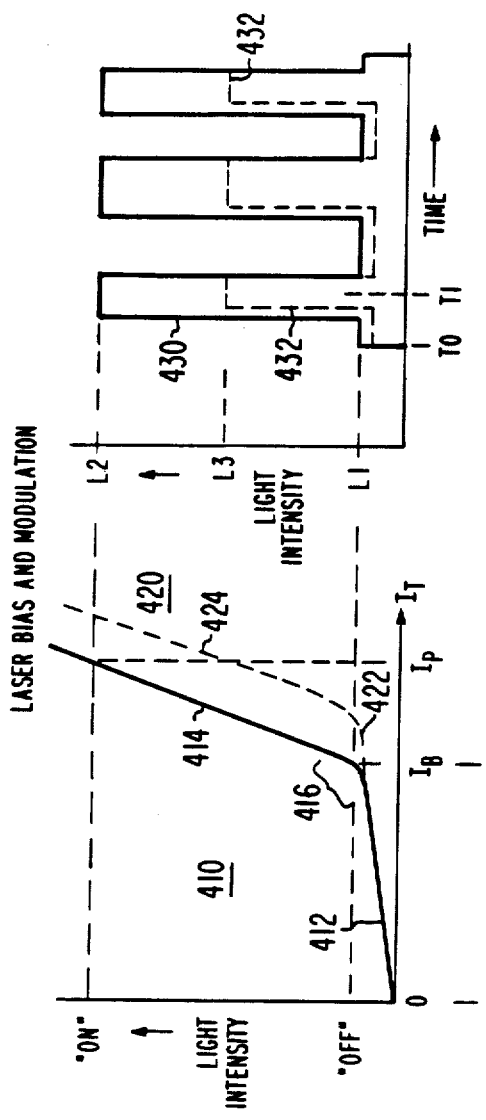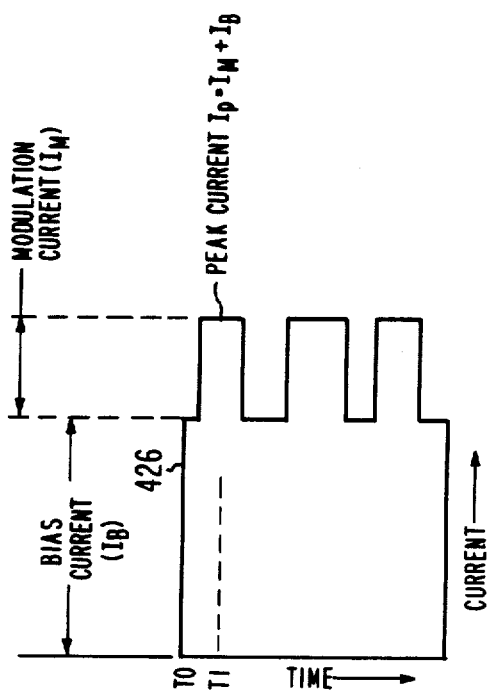

TRANSPARENT LASER DRIVE CURRENT UPDATE FOR BURST MODE FIBER OPTIC COMMUNICATION SYSTEM

This invention relates to arrangements for establishing bias and/or modulation currents for laser diodes which are used for burst mode data communications in fiber optic communication networks. In particular, the invention establishes the drive current from measurements made during one burst interval, calculates and stores the new value, and applies the new value of drive current during the entirety of a later burst transmission.

BACKGROUND OF THE INVENTION

Local area networks (LAN) are communication networks operating on a common bus or which have a common central combining point, which provide intercommunications among three or more data terminals, stations or nodes. Such a network might be used, for example, for intercommunications among computer terminals in a building or on a military installation. In general, a LAN may provide signal transmission by two-wire transmission lines (as, for example, a telephone line), or for higher data rates may use coaxial cable. Significant disadvantages of coaxial cable are weight, volume and cost, which become important factors when the number of nodes to be interconnected or their separation is large. Furthermore, coaxial cable has substantial attenuation, which becomes a problem when the distances between nodes are substantial. The attenuation of coaxial cables may require the use of repeater amplifiers, which add to the cost and complexity of the communication system. Fiber optic (FO) communication networks have received increasing attention because of their advantages by comparison with coaxial cable. Fiber optic cables have the potential for being low in cost, and are light in weight and small in volume. Furthermore, the attenuation of fiber optic cables is much lower than that of coaxial cable, thereby allowing longer runs without repeaters. A further advantage of fiber optic cables over coaxial cables lies in the bandwidth, which may be greater than that of coaxial cable, thereby allowing a single fiber optic cable to carry more information than a coaxial cable. A yet further advantage of fiber-optic cables is low susceptibility to electromagnetic radiation.

In a fiber optic communication system, the computer or other source and sink of data at any node is coupled to the fiber optic bus or cable by an optical receiver with a photodetector for receiving signals, and by an optical transmitter with an optical source for transmission. The photodetector receives light signals from the fiber optic bus and converts the signals into electric signals which can be used by the computer. The optical transmitter receives electrical signals from the source of data and converts these signals into pulses of light which are propagated into the fiber optic bus.

The fiber optic transmitter may be a solid state light emitting device. The light emitting devices commonly available at the current state of the art are the light emitting diode (LED) and the laser diode. There are structural differences between LEDs and laser diodes which are not important to the invention, but functionally the differences include the fact that a LED is a relatively low power, low data rate optical source by comparison with a laser diode. For those situations in which a LAN has a high data rate, covers long distances, or has a large number of nodes (thereby requiring dividing of the transmitted light energy into many parts), the laser diode is preferred as an optical transmitter.

A laser diode has a characteristic of light output versus drive current which includes a first portion in which the light emitted as a function of drive current increases relatively slowly from zero light to a first level of light which occurs at a knee point. The characteristic also includes a second portion in which the light emitted as a function of drive current increases relatively quickly for drive currents exceeding the drive current corresponding to the knee point. The value of the maximum drive current may be established by considerations such as heating of the diode by the drive current and the resulting level of reliability. In general, for good reliability the maximum operating drive current is much less then the maximum current which the light emitting device can withstand.

The data communicated by the local area network is ordinarily in the form of binary pulses having logic high and low levels. Communication among a large number of users on a FO bus requires multiplexing. This is often accomplished by the well known time division multiplexing, in which each user gains exclusive access to the bus for communication to all other stations. Each node is controlled so that it transmits at a time when the fiber optic bus is not in use by other nodes, because use by more than one transmitting node might cause the logic low level transmitted by a first node to be masked by the logic high level transmitted by a second node, resulting in destruction of information. This scheduling of transmission is achieved in many ways known in the art, among which are "token passing" protocols in which the node which is currently transmitting, upon completion of its normal message(s), may transmit a signal representing the end of transmission, thereby advising the next node allowed to transmit that transmissions may begin. During transmission by the station having access to the bus, other stations ideally do not transmit. Thus, each station transmits to all other stations without interference. When there are a large number of users of the bus, each user station can have exclusive access for only a limited time. During that time, all data to be transmitted by the station must be transmitted. The increasing complexity of computerized communication systems, the large number of users and the vast amount of data to be communicated have resulted in ever-increasing data rates and a shortening of the duration of the transmitted data burst associated with each transmission. At the present state of the art, fiber optic communication of Manchester encoded data can be accomplished at data rates of at least 200 Mbits/sec, corresponding to a raw (unencoded) digital data rate of 400 Mbits/sec.

In principle, the logic high level of the binary pulses turn the diode to an ON condition by a forward bias current which causes light output which represents the logic high level of the binary pulse, and the device is deenergized (deprived of current) and therefore produces no light output in order to represent a logic low level. For communications at low data rates this simple arrangement may be satisfactory, although the pulses may have a delay in the initiation of the optical output relative to the current drive because of delays in the conversion process of electron injection to optical (photon) emission. This in turn affects pulse symmetry and fidelity. For high data rate communications, however, timing considerations require that the transmitted light pulses have relatively well defined symmetry and overall pulse fidelity. It is known to bias each of the light emitting devices to the knee current with a direct current bias which represents a logic low level, and to superimpose upon the bias current a further modulating current which represents the logic high level of the data to be transmitted. The bias and modulating currents are generically termed drive currents. Thus, a logic low level produces a drive current which in turn produces a light output from the light emitting device corresponding to the light output at the knee current, and the light output representing logic high level is greater than the knee current light output.

When there are a large number of nodes or stations associated with the local area network, and each node includes a light emitting device coupled to a fiber optic (FO) bus, a system problem arises if all of the light emitting devices are biased at the knee current. Each light emitting device when biased to the knee current emits a finite amount of light. Thus, the fiber optic bus has a continuous illumination attributable to the knee current of the light emitting device at each node. This illumination is a background illumination upon which the illumination representing the data to be transmitted is superimposed. The likelihood of being able to detect the desired signal decreases as the noise floor rises as a result of the background illumination. This, in turn, may reduce the maximum length of run of fiber optic cable which can be used before cable attenuation reduces the signal to an undesirably low level.

U.S. Pat. No. 4,558,465 issued Dec. 10, 1985, in the name of Siegel et al. recognizes that in a communication system using light emitting devices which are biased to a knee, the cumulative light on the system represents a noise background which adversely affects communication. According to the Siegel et al. arrangement, the knee-point bias of all optical transmitters is turned off except for the one currently transmitting. When transmission is about to begin from any node, the optical transmitter at that node is biased to its knee current, and the bias is maintained for the duration of the data transmission. The data transmission is accomplished by excursions of a modulating current above the knee current. This arrangement effectively eliminates residual light on the system, and reduces system noise to improve communications, while at the same time providing desirable pulse fidelity.

The light versus current drive (bias and modulating current) characteristics of laser diodes change as a function of temperature and also as a result of aging of the device. These changes are manifested for the most part as a change in the magnitude of the bias current at the knee between the two regions of the characteristic. Generally, the slope of light output versus bias current remains the same in the region below knee point, and only the magnitude of the current at the knee point changes. Adjustment or refresh of the drive current to compensate for changes in characteristics may be accomplished by slowly increasing the bias current from zero bias current, while monitoring the light output of the light emitting device. The bias current required to obtain a predetermined light output is the knee current. The modulation current may be established in a similar manner. In a communications system including only a single continuously operating data transmitter, it is clear that communications must be interrupted to set the bias or modulation currents in this manner.

Some prior art arrangements continuously control the drive currents during data transmission by comparing the light output of logic high and logic low levels of the data with a predetermined standard, which may be the average light output. When burst data communications are involved, data bits of the burst may not be properly controlled with such a scheme because the average light output cannot be properly established due to the short duty cycle of the burst. Also, when the data rate is very high, as for example more than 400 Mbits/second at the current state of the art, it is difficult to sample during and between the data pulses to establish the amount of light existing during a logic high or low level. Even if it is possible to sample a signal representative of the light output and process it during a burst by the use of very high speed logic, the cost of such logic might not be justifiable.

In the aforementioned Siegel et al. arrangement, a control logic arrangement excites the light emitting device with a first excitation current which increases from zero. The light output of the device is monitored until the light emitted reaches the intensity representing the knee of the operating characteristic curve. A storage logic is provided for storing the magnitude of the knee current so that is can be reproduced. The knee current is then maintained constant during further bias adjustment. A second logic control circuit further excites the diode with a further increasing current until the diode emits the desired light intensity corresponding to the maximum bias. Information relating to the maximum bias current is stored so that it can also be reproduced. This completes the bias current adjustment. Switching logic is coupled to the source of data and to the logic circuits which switches the bias between the knee current bias and the maximum current bias in response to logic low and logic high levels of the data. During the adjustment interval, the light emitting device emits the maximum amount of light. This may interfere with the communications on the network if the optical transmitter remains coupled to the fiber optic bus. Interruption of operation is required if the optical transmitter is disconnected from the fiber optic bus.

If it is desired to couple another user station to the bus of an existing fiber optic communication system which is in operation, the use of the aforementioned Siegel arrangement for adjusting drive current may result in destruction of information being communicated among other stations unless the additional user station is decoupled from the bus during drive current adjustment.

A burst mode fiber optic transmission system is desired in which the drive current of the light emitting devices may be adjusted without interrupting system operation, and which is capable of use in high data rate burst mode communications systems.

SUMMARY OF THE INVENTION

A burst mode fiber optic communication station includes a light emitting device having a knee current representing a threshold illumination and light-output-versus-drive-current characteristics which change with time. The light emitting device at each station is biased to the knee current to produce threshold excitation during an interval that includes each data burst. The light emitting device is further driven with a modulating current in one of two logic states representing the data. The knee current is removed from the light emitting device during most or all of the interval between successive burst transmissions in order to reduce the system noise resulting from the residual light attributable to threshold excitation. The light output of the light emitting device must be sampled during the interval when the light emitting device is excited. When the data rate is very high, the duration of excitation may be so short that the length of time required to accomplish sampling of the light extends over a substantial part or all of the burst interval. Processing of the sampled signal may require yet more time. Consequently, the sampled burst may have ended, or the sampled burst and additional data bursts transmitted from the station may have occurred before the signal processing associated with the bias or modulating current control determines the magnitude of the actual light output relative to the desired light output, and the drive current which will provide the correct light output. If the correction to the drive current is made at a time during which transmission is occurring, the change in drive current may be interpreted as a data transition and cause the signal as received to contain errors. A timing control circuit causes the drive current change to be inhibited during transmissions, so that each burst transmission is made with drive currents which are invariant during that burst.

DESCRIPTION OF THE DRAWING

FIG. 4a is a plot of the light output as a function of drive current of a laser diode which may be used as a light emitting device in the arrangement of FIG. 3, FIG. 4b is a plot of drive current vs time which may be applied to the characteristic of FIG. 4a, and FIG. 4c is a plot of light output vs time resulting from application of the current of FIG. 4b to the characteristic of FIG. 4a;

DETAILED DESCRIPTION OF THE INVENTION

Figure 1:
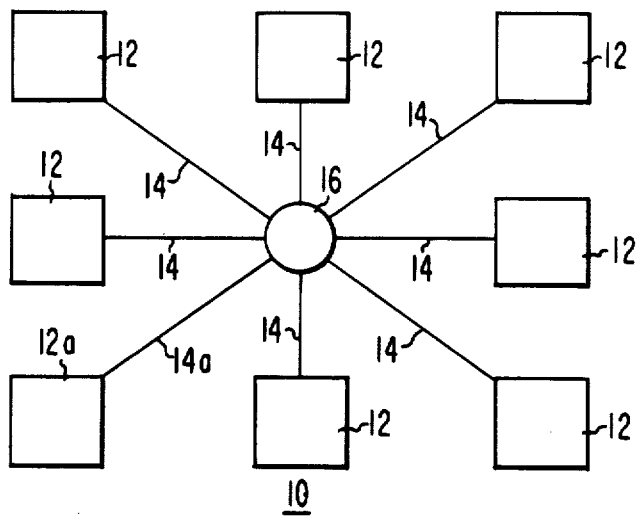
FIG. 1 is a block diagram of a fiber optic communication system including a plurality of nodes and a central combining print.

FIG. 1 illustrates a fiber optic communication system for communicating among a plurality of stations or nodes 12 by way of fiber optic cables 14 and a common combining point 16. A representative node 12a and fiber optic cable 14a are also illustrated. Combining point 16 may be a star coupler as known in the art for receiving signals propagating along a fiber optic cable such as cable 14a and for dividing the light signal from fiber optic cable 14a and coupling a portion to all other fiber optic cables 14 and to their respective nodes 12.

Figure 2:
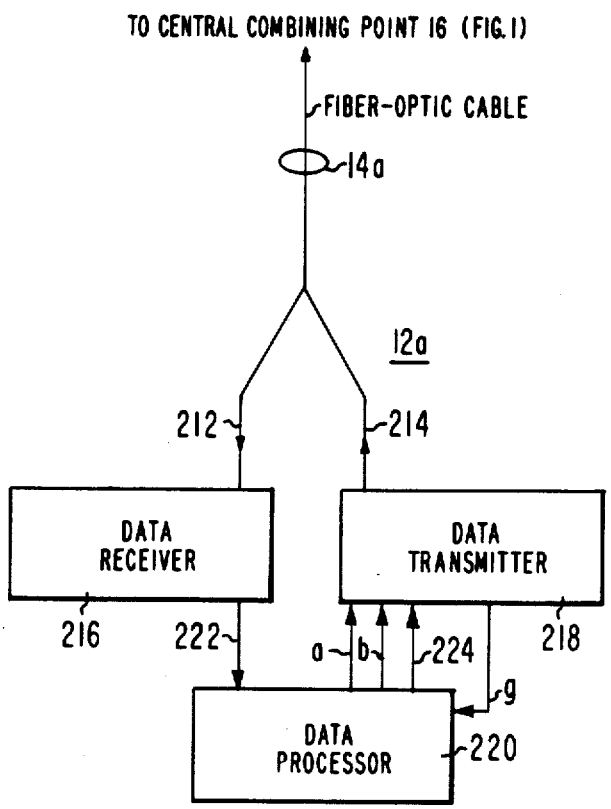
FIG. 2 is a block diagram of a representative fiber optic transmitter-receiver at a node of the arrangement of FIG. 1.

FIG. 2 is a block diagram of representative station or node 12a and fiber optic cable 14a of FIG. 1. In FIG. 2, it can be seen that fiber optic cable 14a includes two fiber optic waveguides 212 and 214 which are coupled to a data receiver 216 and to a data transmitter 218, respectively. Data receiver 216 responds to light signals received from fiber optic waveguide 212 for producing data which is coupled by way of a conductor or conductor set 222 to a data processor 220. As known, the data may be in either serial or parallel form, and either a single conductor or a set of conductors is used for carrying the data. For simplicity, sets of conductors are hereinafter treated as though they were a single conductor. Data processor 220 processes the received data (together with data from a local source if desired) and applies signals to data transmitter 218 over conductors a, b and 224, for control of transmissions over fiber optic waveguide 214, and receives certain timing signals from conductor g.

Figure 3:
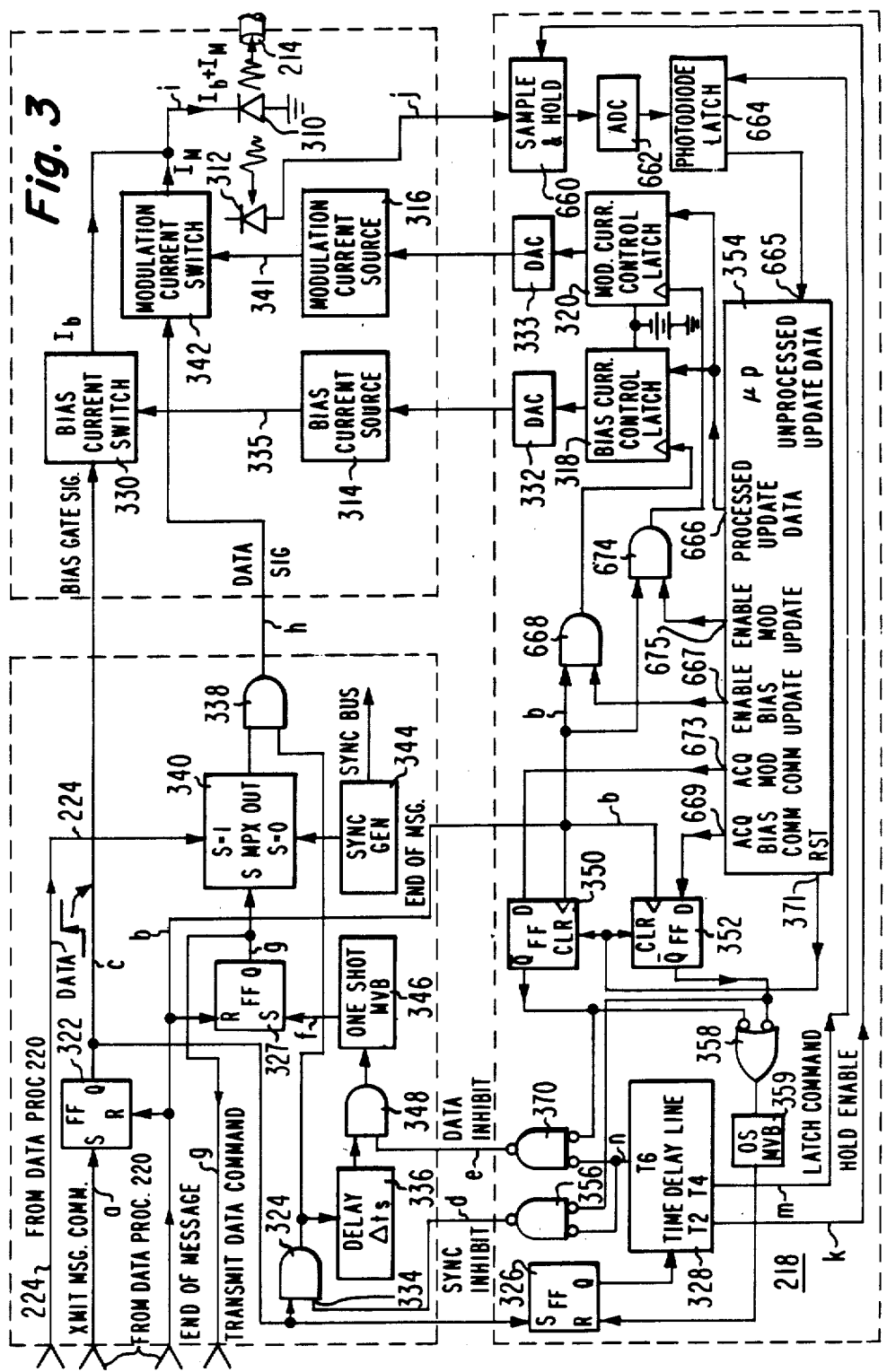
FIG. 3 is a simplified block diagram of the transmitter of FIG. 2.

FIG. 3 is a simplified block diagram of data transmitter 218 of FIG. 2. Elements of FIG. 3 corresponding to those of FIG. 2 are designated by the same reference numeral. Generally speaking, the arrangement of FIG. 3 receives data and an associated transmit message command (XMIT MSG. COMM.) on conductors a and 224 from data processor 220, and applies bias current and modulation current to a light emitting device 310 which may be a laser diode. Laser diode 310 produces modulated light signals which are applied to fiber optic waveguide 214 and to a monitor photodiode 312. The bias current and modulation current are generated by bias current and modulation current sources 314 and 316, respectively, which are controlled by current magnitude control words stored in latches 318 and 320, respectively. In a first or normal mode of operation, the data is simply transmitted in bursts using the bias and modulation current which are derived from the stored control words, and the stored control words are not updated. After a period of time, the transmitter enters a second mode of operation. In the second mode of operation, the light output of laser diode 310 as sensed by photodiode 312 is sampled during a time when the transmitter has control of the bus and only bias current is applied. This sampling occurs before burst transmission of data. The signal so sampled is processed for a period which may exceed the burst duration, and the corrected bias current control word is stored in latch 318 at a time when transmissions are not taking place. The system then returns to the first mode of operation for a predetermined interval, followed by a third mode of operation. In the third mode of operation, the light output of laser diode 310 as sensed by photodiode 312 is sampled during the burst transmission, the sampled value is processed for a period which may exceed the duration of the burst transmission, and an updated modulation current control word is stored in latch 320 at a time between burst transmissions.

FIG. 4a illustrates the current-versus-light intensity characteristic 410 of laser diode 310. In FIG. 4a, characteristic 410 includes a first solid-line portion 412 extending from a total drive current ($I_T$) of zero to a bias current $I_B$ in which the slope or rate of increase of light intensity as a function of incremental total current is relatively low, and a second portion 414 extending from a bias current of $I_B$ to a peak drive current $I_P$ (which is the sum of bias current $I_B$ and the peak value of modulating current $I_M$) in which the rate of increase of light intensity for an incremental change of total current is relatively large. There is a transition region 416 between portions 412 and 414 of characteristic 410 known as a "knee" region, which the slope of the characteristic changes rapidly.

Dotted characteristic 420 of FIG. 4a illustrates in exaggerated form a type of change of the laser diode characteristic which occurs under the influence of time or temperature changes. As illustrated, curve 420 includes a portion 422 which continues the slope of portion 412 of characteristic 410. The "knee" region occurs at a higher current level than current $I_B$, and curve 420 includes a further portion 424 having a slope parallel to that of portion 414 of characteristic 410. The net effect of the change from characteristic 410 to 420, as illustrated, is to reposition the knee substantially midway between currents $I_B$ and $I_P$.

FIG. 4b illustrates the total drive current 426, including bias currents and modulation currents, which are applied as a function of time to the characteristic of FIG. 4a. In FIG. 4b, the total drive current is at the bias current level beginning at a time T0, and a peak drive current $I_P$ is applied during a data interval including a time T1. As illustrated by curve 430 of FIG. 4c, the result of applying current 426 to a laser diode having a characteristic such as 410 of FIG. 4a results in substantially square-edged light pulses having a light intensity which varies between values of L1 and L2 in response to the modulating current. Dotted characteristic 432 of FIG. 4c illustrates the light output resulting from application of current 426 to a laser diode having the modified characteristic 420 of FIG. 4a. As illustrated, the peak light output is reduced from L2 to L3. Furthermore, the leading light pulse edges tend to be delayed as illustrated, because the modulating current $I_M$ takes excursions through the knee portion of modified characteristic 420 of FIG. 4a. The reduced light intensity of curve 432 and its delayed transitions are undesirable in a communications system, and are particularly undesirable for a high data rate system. It might be thought that, since the peak light intensity has changed, that the proper correction requires an increase in modulating current $I_M$ to restore the light intensity. However, this solution is undesirable because of thermal effects, and does not solve the problem of delayed data transition. It has been found to be desirable to correct for changes such as the change from curve 410 to curve 420 of FIG. 4a by adjusting bias current $I_B$.

Other changes in the characteristics of a laser diode may occur. For example, the slope of portion 424 of curve 420 of FIG. 4a may change. It is desirable to correct for such changes by adjusting modulation current $I_M$.

When data processor 220 (FIG. 2) has data to be transmitted, and it has been determined (by receipt of a token, for example) that data transmission is to take place, a transmit message command (XMIT MSG. COMM.) is applied over conductor a to the set (S) input terminal of a flip-flop (FF) 322 (FIG. 3), as illustrated at time T0 by pulse 510 of FIG. 5a. Flip-flop 322 becomes set, and its Q output applies a transition to a logic high level to a conductor c, as illustrated by 514 of FIG. 5c. The signal from the Q output of FF 322 is applied by conductor c to an input of an AND gate 324, to the S input of a FF 326 and to the control input terminal of a bias current switch 330. As soon as the Q output of FF 322 goes to a logic high level, switch 330 is enabled to pass bias current ($I_b$) applied from bias current source 314 and conductor 335 to laser diode 310 by way of a conductor i. As mentioned, the magnitude of the bias current from source 314 is controlled by a bias current control word stored in latch 318. The bias current control word is applied by way of a digital-to-analog converter (DAC) 332 to the control input of bias current source 314.

Just before transmission during normal operation (just before time T0), the sync inhibit signal (516 of FIG. 5d) applied by conductor d to an input terminal 334 of AND gate 324 and the data inhibit signal (518 of FIG. 5e) applied by a conductor e to an AND gate 348 are in a logic high condition, and FF 326 is in a set condition. The transition at time T0 at the Q output of FF 322, therefore, has no effect of FF 326, but the transition is coupled through enabled AND gate 324 to the input of a delay line 336 and to the input of an AND gate 338. The high level applied to AND gate 338 enables gate 338 beginning at time T0 for coupling signal from a multiplex (MPX) circuit 340 to a modulation current switch 342. Multiplex circuit 340 couples a sync signal from a sync generator 344 through enabled AND gate 338 to modulation current switch 342. Sync generator 344 generates a synchronizing signal having a predetermined duty cycle. As illustrated in FIG. 5h in the interval T0–T2, the synchronizing signal is a square wave 524 having a 50% duty cycle. Modulation current switch 342 applies modulation current from source 316 over conductor 341 to laser diode 310 in response to the logic level of the signal applied to modulation current switch 342 as described in conjunction with FIG. 4. The sum of the bias current $I_B$ and the modulating current $I_M$ as modulated by the synchronizing square wave is illustrated by waveform 527 of FIG. 5i in the interval T0–T2. The sum current through laser diode 310 causes emission of light, part of which is intercepted by monitor photodiode 312 to produce on conductor j a photodiode signal illustrated as 528 of FIG. 5j.

Figure 5:
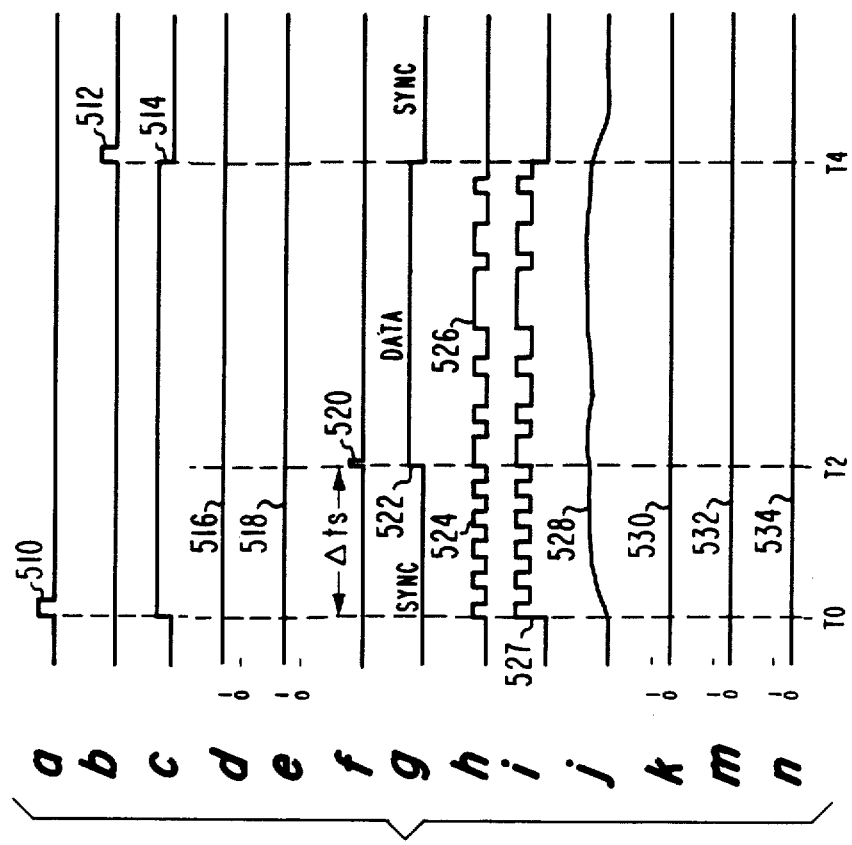
FIG. 5 is a timing diagram aiding in understanding the operation of the transmitter of FIG. 3 in a normal operating mode.

At a time T2 as illustrated in FIG. 5 delayed by a time $\Delta t_s$ from time $T_0$, the transition to a logic high level propagating through delay line 336 triggers a one shot multivibrator (OS MVB) 346 by way of an enabled AND gate 348. Multivibrator 346 produces on conductor f a pulse illustrated as 520 in FIG. 5f. Pulse 520 is applied at time T2 to the S (set) input of a FF 327 to set its Q output and conductor g to a logic high level, as illustrated by 522 of FIG. 5g. The logic high level on conductor g is applied to the S select input terminal of MPX circuit 340, thereby changing its state by decoupling the multiplex output terminal from sync generator 344 and coupling it instead to conductor 224 for receiving data from data processor 220. Simultaneously, the transition of waveform 522 on conductor g at time T2 is applied to data processor 220 (FIG. 2) to initiate the transfer of data therefrom. The data from processor 220 is coupled over conductor 224, through multiplex circuit 340, AND gate 338 and conductor h to modulation current switch 342 for enabling switch 342 in response to the logic high portions of the data signal. The data signal on conductor h is illustrated in FIG. 5h as portion 526 in the interval T2–T4. When so enabled, modulation current switch 342 in response to logic high portions of the data signal couples modulation current from source 316 to conductor i where the modulation current is added to the bias current and applied to laser diode 310, to produce a summed current illustrated as 527 of FIG. 5i in the interval T2–T4. When the last bit of data associated with a data burst leaves data processor 220 at a time T4, processor 220 produces on conductor b an end-of-message (EOM) signal illustrated as 512 in FIG. 5b. The EOM signal is applied to the reset (R) input terminals of flip-flops 322 and 327 and, for purposes described below, to the clock input terminals of data (D) flip-flops 350 and 352. Application of the EOM signal from conductor b to the R input terminal of FF 322 causes reset of the signal on conductor c to a logic zero level, as illustrated by the transition of signal 514 of FIG. 5c at time T4. This transition disables bias current switch 330, stopping the flow of bias current to the laser diode. The logic low level on conductor c also disables AND gate 324 which in turn disables AND gate 338. The application of the EOM signal to the R input of FF 327 causes the signal level on conductor g to make a transition to a logic zero level, as illustrated by the transition of signal 522 of FIG. 5g at time T4, which causes transfer of control of the output terminal of multiplex circuit 340 to return to sync generator 344. However, no sync signals are applied to modulation current switch 322 because AND gate 338 is disabled. Thereafter, in the normal mode of operation, transmitter 218 remains quiescent until receipt of the next transmit message command from data processor 220 on conductor a or, as described below, activity occurs in readiness for refresh of the laser drive currents.

Figure 6:
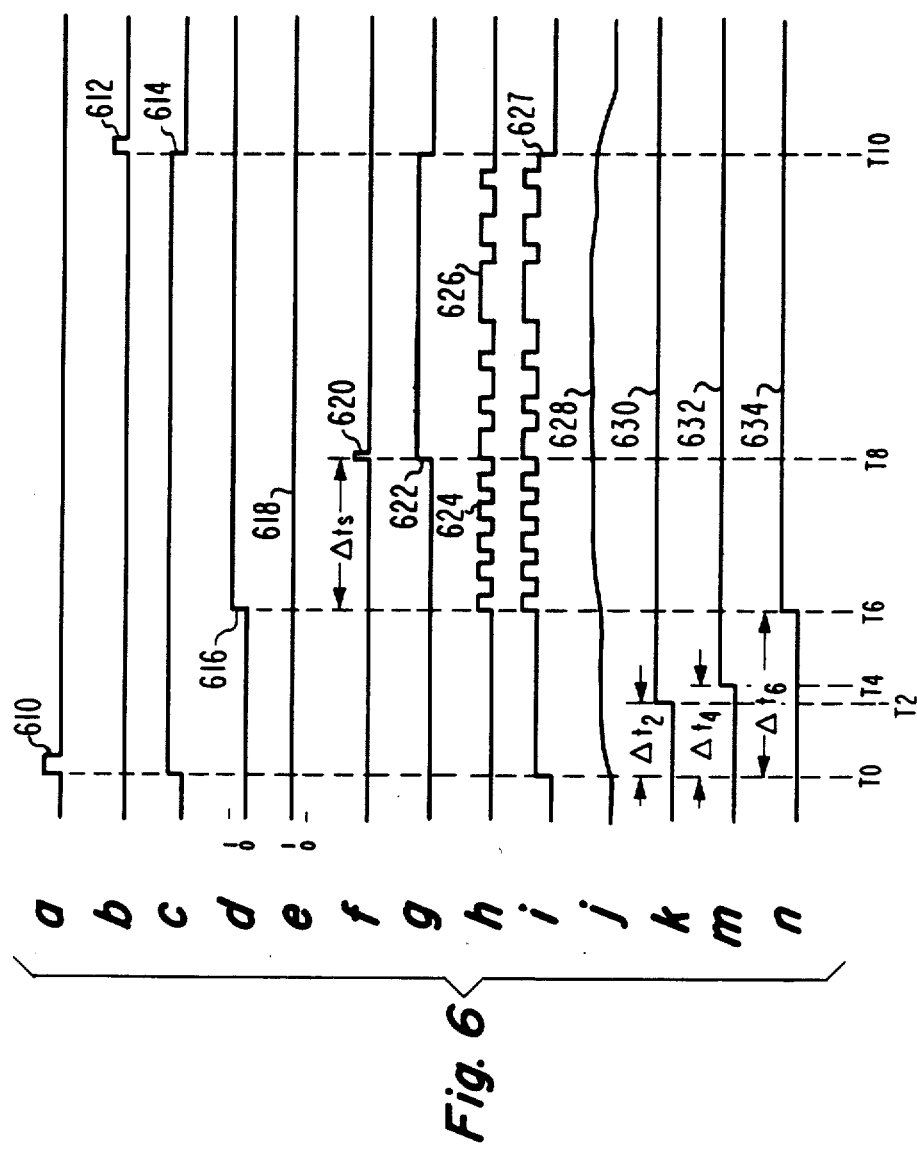
FIG. 6 is a similar timing diagram for the bias current refresh operating mode.

The second mode of operation is initiated when a microprocessor (μP) 354 decides, due to the passage of time, that the bias current should be updated, and so indicates by setting to a logic high level its acquire bias command (ACQ. BIAS COMM.) output terminal 669. The acquire bias command output terminal is coupled to the D input terminal of FF 352. At the end of the next transmitted message, the EOM signal on conductor b is applied to the clock input terminal of FF 352 and causes the logic high level on the D input of FF 352 to be coupled as a logic low level to the $\bar{Q}$ output. The transition to a logic low level at the $\bar{Q}$ output of FF 352 is coupled to the R input terminal of FF 326 by way of a negative-logic input OR gate 358 and a one-shot multivibrator (OS MVB) 359 for resetting FF 326. The logic low at the $\bar{Q}$ output of FF 352 is applied to an input terminal of a negative-logic input NAND gate 356, which acts as an OR gate. The sync inhibit signal on conductor d goes to a logic low level, thereby inhibiting AND gate 324 as illustrated by that portion of waveform 616 of FIG. 6d preceding time T6. The system then awaits the next transmit message command from data processor 220. While waiting, flip-flops 322, 326, and 327 are in a reset state, AND gate 324 is inhibited by the logic low level of waveform 616, and AND gate 348 is enabled by the logic high level applied to its input terminal over conductor e, as illustrated by 618 of FIG. 6e.

Upon receipt of the next following transmit message command over conductor a from data processor 220, as illustrated by 610 of FIG. 6a at time T0, FF 322 is set to produce a transition to a logic high level on conductor c, as illustrated by 614 of FIG. 6c at time T0. Signal 614 on conductor c enables bias current switch 330 and allows bias current to begin to flow at time T0 over conductor i to laser diode 310, as illustrated by drive current representative waveform 627 of FIG. 6i in the interval T0-T6. In response, laser diode 310 produces an amount of light attributable to the lasing threshold, part of which is coupled to photodiode 312 to produce on conductor j a signal representative of a threshold amount of light, as illustrated by waveform 628 of FIG. 6j in the interval following time T0. The transition to a logic high level on conductor c at time T0 is not propagated through inhibited AND gate 324, but sets FF 326 to produce a transition to a logic high level at its Q output and at the input of a delay line 328. After a time delay $\Delta t_2$ selected to allow transients of the bias current through laser diode 310 to settle, delay line 328 produces at time T2 a transition to a logic high level on a conductor k, as illustrated by 630 of FIG. 6k. The transition of signal 630 on conductor k is applied to a sample-and-hold circuit 660 which samples the output of photodiode 312. Sample-and-hold circuit 660 responds to the transition of signal 630 at time T2 to hold the signal sampled at time T2. The signal so sampled is applied to an analog-to-digital converter (ADC) 662 which converts the sampled signal into digital form. After a time delay of $\Delta t_4$ selected to be long enough to allow ADC 662 to settle, delay line 328 produces a transition to a logic high level on conductor m, as illustrated by waveform 632 of FIG. 6m at time T4. The transition on conductor m is applied to a photodiode latch 664 which latches the digitized photodiode signal from ADC 662 and applies it to a data input terminal 665 of microprocessor 354. At a time T6 delayed from time T0 by $\Delta t_6$, delay line 328 produces a transition to a logic high level on conductor n as illustrated by signal 634 of FIG. 6n. As illustrated, time T6 is substantially delayed relative to time T2, but in practice time T6 need only be slightly delayed. Signal 634 is coupled through gate 356 onto conductor d as illustrated by 616 of FIG. 6d to enable AND gate 324. When enabled, AND gate 324 immediately enables AND gate 338, thereby allowing sync signal to be coupled from sync generator 344 through multiplex circuit 340 onto conductor h beginning at a time T6. The square-wave synchronizing data signal on conductor h is illustrated as 624 of FIG. 6h, and occurs in the interval T6-T8. The sync signal on conductor h is applied to modulation current switch 342, which responds to the logic high portions thereof to couple modulation current from source 316 onto conductor i. The modulation current and bias current are summed on conductor i to produce the drive current signal illustrated as 627 of FIG. 6i which is the total drive current of laser diode 310. After a delay of $\Delta t_5$ from the time T6 at which it is driven from AND gate 324, delay line 336 produces an output signal at time T8 which is coupled through enabled AND gate 348 to one-shot MVB 346, which responds by producing a pulse on conductor f which is illustrated as 620 of FIG. 6f. Pulse 620 sets FF 327, thereby producing a logic high level on conductor g beginning at time T8, as illustrated by 622 of FIG. 6g, which causes data processor 220 (FIG. 2) to begin producing data on conductor 224, and which switches multiplex circuit 340 to couple the data from conductor 224 through AND gate 338 to switch 342. Thus, the synchronizing signal 624 on conductor h is followed by the data signal 626, as illustrated by the portion 626 of the waveform of FIG. 6h in the interval T8-T10, and these signals are transmitted by laser diode 310. At time T10, an end of message (EOM) signal from data processor 220 applied to conductor b (612 of FIG. 6b) resets flip-flops 322 and 327, thereby ceasing transmission. Flip-flop 326 remains in the set state, thereby continuing to couple a logic high level through delay line 328 to an input terminal of gate 356 and coupling a logic high level to negative-logic input NAND gate 370. The logic high level applied to gates 356 and 370 is coupled therethrough to conductors d and e, respectively, to maintain AND gates 324 and 348, respectively, enabled. With AND gates 324 and 348 enabled, transmission may thereafter occur in the normal manner described above.

During the transmission of the synchronizing data pulses after time T6 (FIG. 6) in the second mode of operation, microprocessor ($\mu$P) 354 begins to calculate from the photodiode latch signal the desired value of bias current. Because $\mu$P 354 is comparatively slow, the calculations may not be completed until after one or more further data transmissions take place. The further data transmissions are not affected by the calculation process, as mentioned, because the sync inhibit signal on conductor d and the data inhibit signal on conductor e are maintained logic high. Flip-flop 326 is reset only when $\mu$P 354 has completed its calculations, as described below.

When $\mu$P 354 completes its calculations, it produces an updated bias current representative word on processed update data output terminal 666. The bias current word is applied to inputs of both bias current control latch 318 and modulation current control latch 320. At the same time, $\mu$P 354 produces an enable bias update signal on an output terminal 667 which indicates that a bias word is available on terminal 666. The enable bias update signal is applied from terminal 667 to an input terminal of an AND gate 668. Another input terminal of AND gate 668 is coupled to conductor b. The enable bias update signal is not applied through AND gate 668 to bias current control latch 318 until receipt of an end of message signal on conductor b. This guarantees that the bias current control latch is not updated during transmission of a message, but only after the end of a message. As soon as the EOM signal is received, the new bias current word is loaded into latch 318, and $\mu$P 354 then produces a reset signal at output terminal 371 which is applied to the clear (CLR) input terminals of FF 350 and 352. This produces a transition to a logic high level at the $\overline{Q}$ output of FF 352 which is coupled through negative logic input OR gate 358 to MVB 359, but which does not trigger MVB 359. Flip-flop 326 in the absence of a pulse from MVB 359 remains set. As described below, the microprocessor then enters its third mode of operation, in which the modulation current is updated.

The modulation current update mode of operation is initiated when $\mu$P 354 produces a logic high level on its acquire modulation command (ACQ. MOD. COMM.) output terminal 673 and applies it to the D input of FF 350. After the next transmitted message, the EOM signal applied by way of conductor b to the clock input of FF 350 causes the $\overline{Q}$ output of FF 350 to make a transition to a logic low level. The transition is coupled through gate 358 to trigger OS MVB 359, which applies a pulse to the R input of FF 326 for resetting thereof. The transition to a logic low level at the $\overline{Q}$ output of FF 350 is applied to an input terminal of NAND gate 370. Thereafter, the logic low level from FF 350 is coupled by gate 370 onto conductor e to inhibit AND gate 348. This is illustrated by the low state of waveform 718 of FIG. 7e at times prior to time T0. The logic high level at the $\overline{Q}$ output of FF 352 is coupled through gate 356 to produce a logic high level on conductor d as illustrated by waveform 716 of FIG. 7d for enabling AND gate 324.

Figure 7:
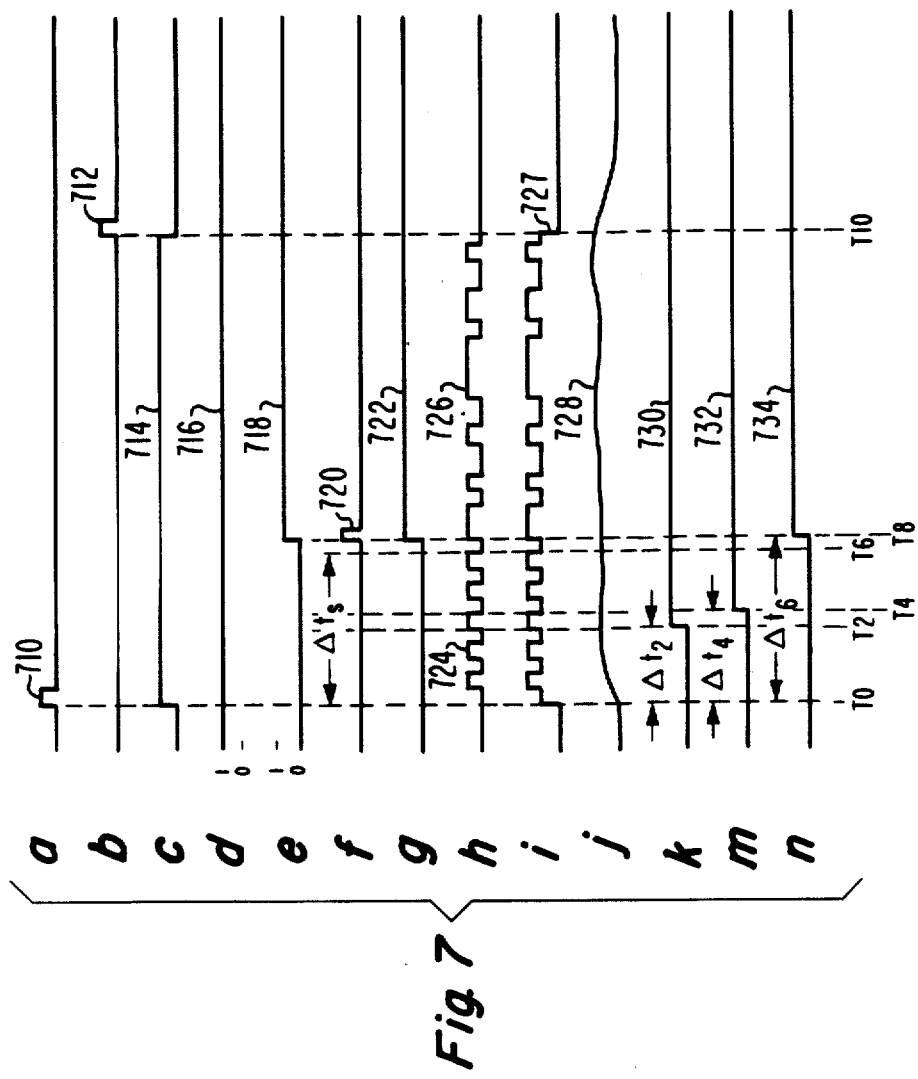
FIG. 7 is a similar timing diagram for the modulation current refresh operating mode.

When the next transmit message command is applied at time T0 by data processor 220 (FIG. 2) to FF 322 as illustrated by 710 of FIG. 7a, FF 322 responds by producing a transition to a logic high level on conductor c, as illustrated by 714 of FIG. 7c. Bias current switch 330 is enabled beginning at time T0 to apply bias current to laser diode 310, as illustrated by the transition at time T0 of waveform 727 of FIG. 7i. The transition of waveform 714 on conductor c is coupled through AND gate 324 to the input of delay line 336 and to enable AND gate 338, thereby allowing synchronizing signals to be coupled beginning at time T0 from generator 344 and multiplex circuit 340 to modulation current switch 342, by way of conductor h, as illustrated by synchronizing signals 724 of FIG. 7h. The transition on conductor c at time T0 is also applied to the S input of FF 326, which produces a transition to a logic high level at its Q output which is thereafter applied to the input of delay line 328. Laser diode 310 produces light in response to the modulation current during logic high portions of the synchronizing signals and in response to the bias current. After time T0, sample-and-hold circuit 660 samples the signal produced on conductor j by monitor photodiode 312 (728 of FIG. 7j) in response to the light output of laser diode 310. During the interval T0-T8, the light is produced in response to the sync signal, which as mentioned has a predetermined duty cycle. As illustrated, the duty cycle is 50%. Laser diode 310 therefore produces peak current $I_P$ (FIG. 4b) half the time and bias current $I_B$ half the time. The output of photodiode 312, therefore, represents an average light output half-way between light outputs $L_1$ and $L_2$ (FIG. 4c). At a time T2, $\Delta t_2$ after time T0, delay line 328 produces on conductor k a transition to a logic high level, as illustrated by waveform 730 of FIG. 7k. This transition causes sample-and-hold circuit 660 to hold the light representative signal. In the interval from time T2 to a time T4, ADC 662 generates a digitized version of the sampled signal and settles. At time T4, $\Delta t_4$ after time T0, delay line 328 produces on conductor m a transition of a signal, as illustrated by 732 in FIG. 7m, which causes latch 664 to latch the digitized version of the photodiode signal. Microprocessor 354 thereafter reads the latched signal. At a time T6 delayed by $\Delta t_5$ from time T0, delay line 336 produces a transition to a logic high level, which is applied to AND gate 348. However, AND gate 348 is disabled at time T6 by the logic low level of waveform 718 on conductor e and does not propagate the transition. At a time T8 delayed by $\Delta t_6$ from time T0, delay line 328 produces a transition to a logic high level on conductor n, as illustrated by 734 of FIG. 7n. This transition is coupled through gate 370 to enable AND gate 348, thereby triggering OS MVB 346 to produce a pulse illustrated as 720 of FIG. 7f. Pulse 720 sets FF 327, causing a transition on conductor g as illustrated by 722 of FIG. 7g. The transition on conductor g changes the state of MPX circuit 340, and causes data processor 220 to begin to apply data over conductor 224 to MPX circuit 340. The data is applied through MPX circuit 340 and AND gate 338 to modulation current switch 342 as illustrated by portion 726 of the waveform of FIG. 7h in the interval T8–T10, causing the data to be transmitted. At time T10, an end-of-message signal illustrated as 712 of FIG. 7b causes transmissions to end.

During and possibly after the transmission burst, $\mu$P 354 calculates the updated value of modulation current ($I_M'$) required to maintain a peak light output of L2. Many types of calculations are possible, depending upon the model chosen to represent the laser characteristics. If it is assumed that the slope of region 414 (FIG.

4a) of the characteristic is constant between the knee point and the peak modulation current, but the value of the constant changes with time, a simple proportioning will suffice. The updated modulation current may be calculated as $$I_M' = I_M(L_R - L_1)/(L - L_1)$$

where $I_M'$ is the updated modulation current, $I_M$ is the present modulation current, $L_1$ is the amount of light produced by the bias current alone, $L_R$ is the reference amount of light attributable to the peak drive current (actually $L_1$ plus the average of $L_2 - L_1$), and L is the measured amount of light with the present drive current.

When the updated modulation current has been calculated by μP 354, a control word is produced on data output terminal 666 for application to both data and modulation current control latches 318 and 320. Microprocessor 354 also produces on terminal 675 an enable modulation update signal which is applied to an AND gate 674. At the next following EOM pulse, AND 674 enables latch 320 to latch the updated word. Thereafter, the updated modulation current is used for all transmissions until the next following refresh cycle.

Figure 8:
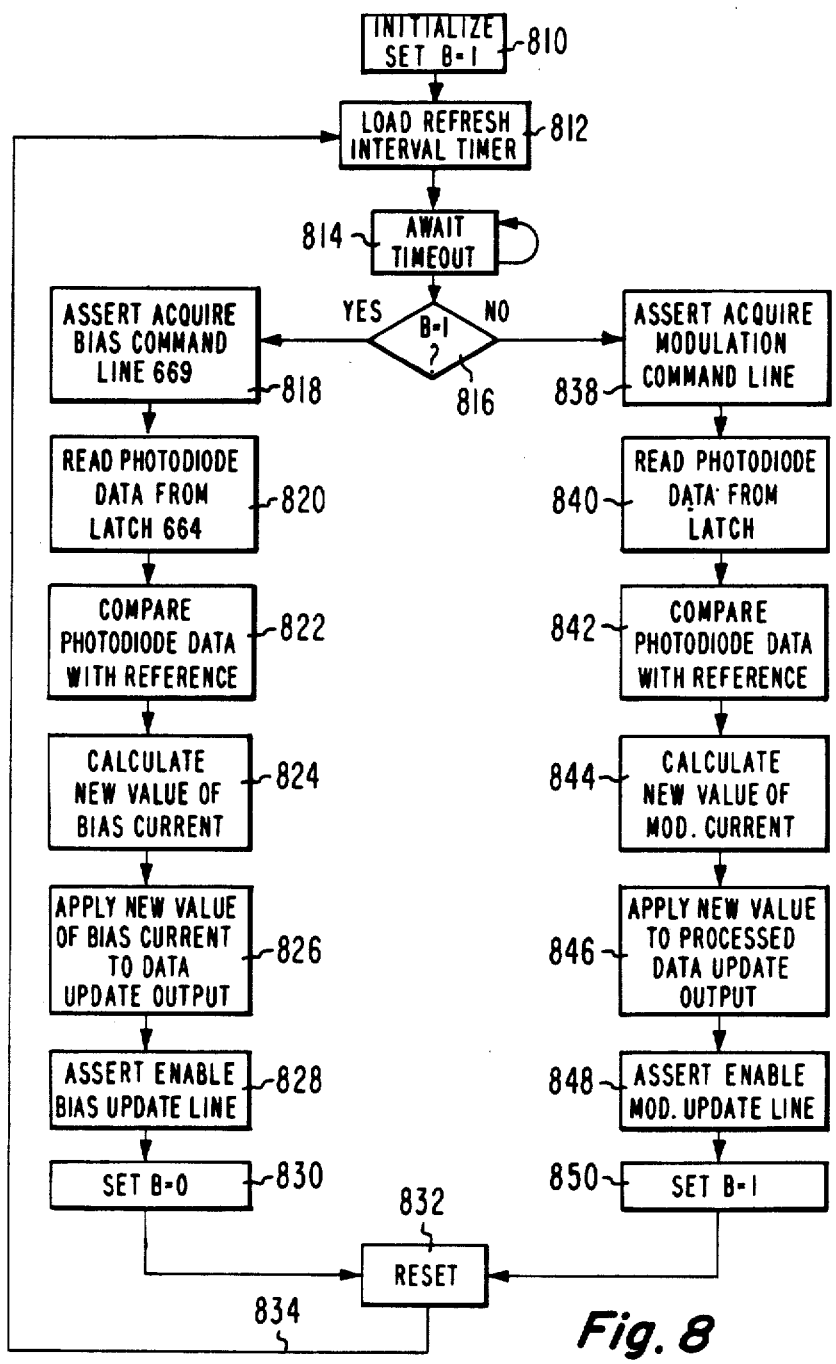
FIG. 8 is a simplified flow chart illustrating the sequence of operation of the microprocessor portion of the transmitter of FIG. 3.

FIG. 8 is a functional flow chart illustrating the program steps performed by μP 354 of FIG. 3. In FIG. 8, block 810 represents initiation of the program at transmitter turn-on and the setting of a running variable B=1. Block 812 represents the loading into an internal countdown timer of a predetermined interval at which drive current refresh is desired. Block 814 represents recurrent examination of the output of timer 812 until the time for refresh is reached. Until this time, transmissions from transmitter 218 of FIG. 3 are performed with the drive currents established by the words then stored in latches 318 and 320. The logic flows from block 814 to decision block 816 in which the value of B is examined. If B equals 1, the logic flows to block 818 which represents assertion of the acquire bias command line by placing a logic high on output terminal 669 of the μP. As mentioned, after the next transmission this results in generation of data at photodiode latch 664 (FIG. 3) for application to input terminal 665 of the μP. Block 820 represents the reading of the photodiode data from latch 664. Block 822 represents a comparison of the light output of laser diode 310 as represented by photodiode data with a reference value. Block 824 represents the calculation of a new value of bias current, and block 826 represents the application of the new calculated value to data update output terminal 666. Block 828 represents the assertion of the enable bias update line by application of a logic high level to output terminal 667 of the microprocessor. Block 830 represents the setting of running variable B to zero, and the logic then flows to block 832 which represents resetting by raising output terminal 371 of μP 354 to a logic high level. The logic then flows by path 834 back to block 812, where the refresh interval timer is again set.

At the next following time out, decision block 816 notes that B≠1, and the logic flows by the NO output to block 838 which represents assertion of the acquire modulation command line by raising output terminal 673 of μP 354 to a logic high. This causes data to be applied to input terminal 665 of μP 354 from photodiode latch 664. The logic flows to block 840, which represents the reading of the photodiode data from the latch. Block 842 represents the comparison of photodiode data with a reference, and block 844 represents the calculation of the new value of modulation current. The type of calculation, as mentioned, will depend upon the assumptions made about the changes to be expected in the characteristic of the laser diode. When the value is calculated, it is applied to output terminal 666, as represented by logic block 846. The logic then flows to a block 848 which represents assertion of the enable modulation update line by applying a logic high to output terminal 675. As mentioned, this causes latching of the updated modulation current word. The logic then flows to a further block 850 which represents setting B=1 and resetting occurs in block 832 before returning by path 834 to block 812.

Figure 9:
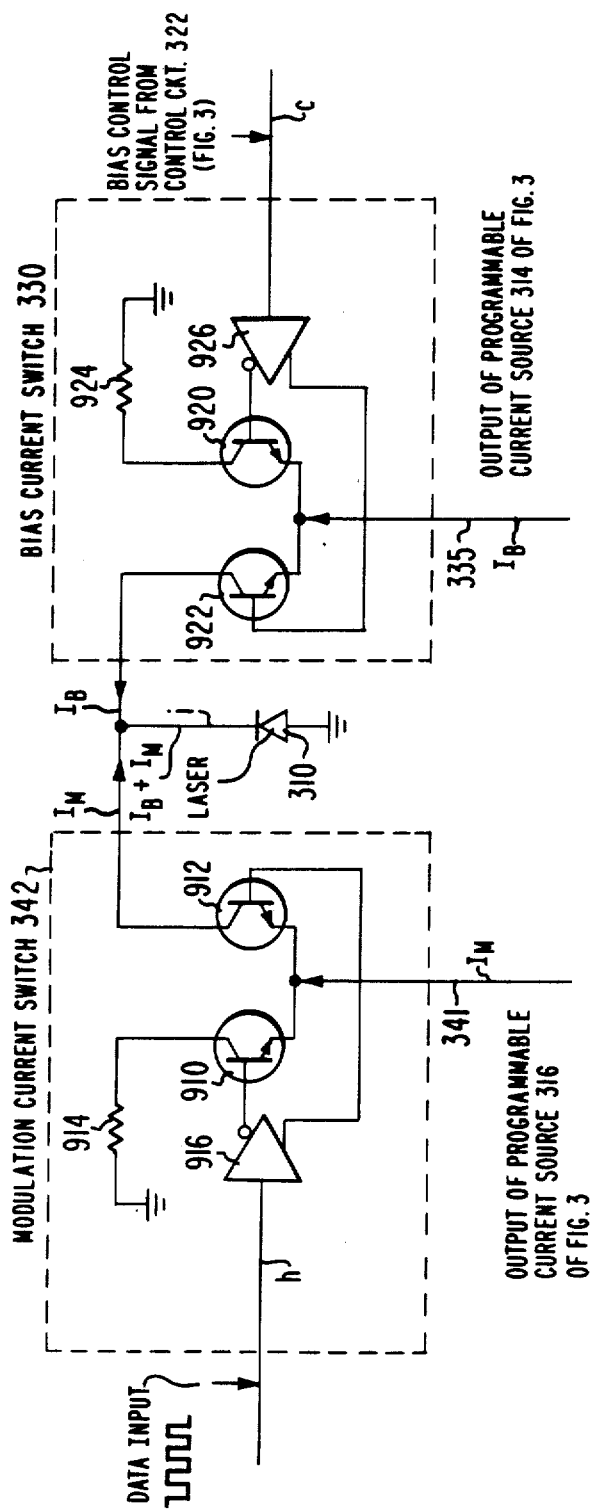
FIG. 9 is a schematic diagram of bias and modulation switches useful in the arrangement of FIG. 3.

FIG. 9 is a schematic diagram illustrating details of bias current switch 330 and modulation current switch 342 of FIG. 3. In FIG. 9, elements corresponding to those of FIG. 3 are designated by the same reference numeral. In FIG. 9, switch 342 includes a pair of bipolar transistors 910 and 912, the emitters of which are coupled to conductor 341 for receiving modulating current $I_M$ from current source 316 of FIG. 3. The collector of transistor 910 is connected by way of resistor 914 to a reference potential illustrated as ground, and the collector of transistor 912 is connected by conductor i to the cathode of laser diode 310. The data is coupled from conductor h to the base of transistor 912 by way of the noninverting output of an amplifier 916, and by way of the inverting output of amplifier 916 to the base of transistor 910 without appreciable relative delay. Such an arrangement alternately enables transistors 910 and 912 in response to data transmissions, thereby switching current $I_M$ from load 914 to conductor i, as transistor 910 alternates conduction with transistor 912.

Bias current switch 330 as illustrated in FIG. 9 also includes a pair of emitter coupled bipolar transistors 920, 922, which are coupled to conductor 335 to receive bias current $I_B$ from current source 314 of FIG. 3. The collector of transistor 920 is connected to a resistor load 924, and the collector of transistor 922 is connected to conductor i. The control signal is coupled to the base of transistor 922 from conductor c by way of the noninverting output of an amplifier 926, and is coupled by way of the inverting output of amplifier 926 to the base of transistor 920. The arrangement of bias switch 330 responds to a bilevel control signal on conductor c for switching current $I_B$ from source 314 alternately to load 924 or to conductor i as transistors 920 and 922 are alternately enabled.

Figure 10:
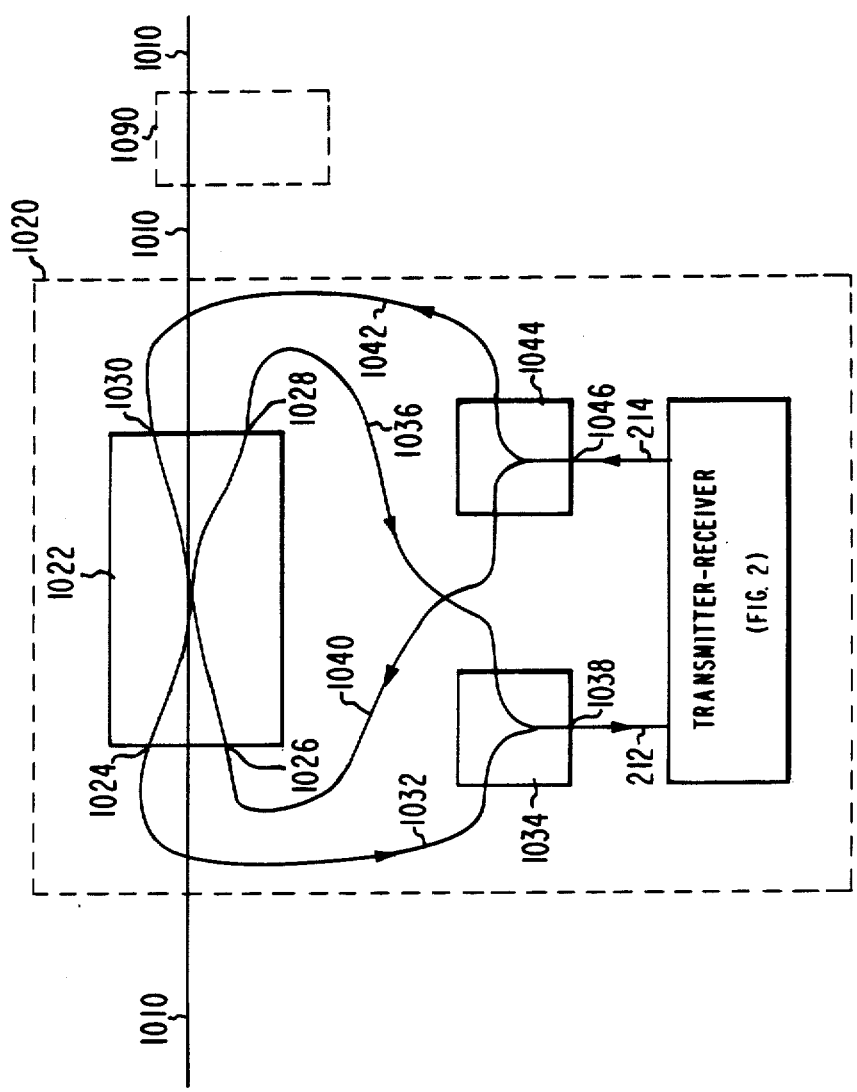
FIG. 10 is a block diagram of an alternative type of fiber optic communication system with which the invention may be used.

FIG. 10 illustrates another type of fiber optic communications system which the invention may be used. In FIG. 10, a fiber optic (FO) bus 1010 supports bidirectional communications among a plurality of nodes, only two of which (1020, 1090) are shown. Node 1020 is taken as representative. In node 1020, a star coupler 1022 is coupled to FO bus 1010 and includes a set of first and second ports 1024, 1026 for communicating with a portion of the FO bus 1010 to the right (as illustrated in FIG. 10) of node 1020, and which also includes a further set consisting of third and fourth ports 1028 and 1030 for communicating with those portions of FO bus 1010 to the left of node 1020. Port 1024 is coupled by a fiber optic cable 1032 to a further star coupler or signal combiner 1034 in which the light signals received from the portion of fiber optic bus 1010 to the right of node 1020 are combined with signals received from the left portion of FO bus 1010 by way of port 1028 and a FO cable 1036, thereby producing at output terminal 1038 of combiner 1034 signals from the entirety of FO bus 1010. Ports 1026 and 1030 of star coupler 1022 are coupled by way of fiber optic cables 1040 and 1042, respectively, to a further star coupler or FO signal splitter 1044. Signals applied to an input port 1046 of splitter 1044 are divided and applied by way of ports 1026 and 1030 of star coupler 1020 to the right and left portions, respectively, of bus 1010. A transmitter-receiver similar to that illustrated in FIG. 2 is coupled to ports 1038 of combiner 1034 and 1046 of splitter 1044 for applying signals to be transmitted to port 1046 and for receiving signals from port 1038, thereby providing bidirectional communications with the entire FO bus.

Other embodiments of the invention will be apparent to those skilled in the art. For example, the drive current refresh cycle may be ongoing, without the delay introduced by the timer 812, 814 of FIG. 8. Alternatively, the decision to refresh may be based upon a measure indicative that a change in the light emitting drive characteristic has changed.

What is claimed is:

1. A bias control circuit for a light emitting device for a data transmitter adapted for burst communications in a fiber optic communications systems, wherein said light emitting device has a light-versus-drive-current characteristic including a first portion in which the light emitted as a function of drive current increases relatively slowly from zero to a first level which occurs at a knee point, and also including a second portion in which the light emitted as a function of drive current increases relatively quickly for drive currents exceeding the drive current corresponding to said knee point, said circuit comprising:
   a controllable drive current source coupled to the light emitting device for applying drive current thereto, said controllable drive current source being enabled in response to an enable control signal applied to an enable input terminal for supplying said drive current, the magnitude of which is established in response to a magnitude control signal applied to a magnitude input terminal;
   a source of burst data signals;
   enable control signal generating means coupled to said source of burst digital data signals and to said controllable drive current source for generating said enable control signal during an enabled interval at least equal to the duration of one burst of said burst digital data and for applying said enable control signal to said enable input terminal of said controllable drive current source, whereby said drive current is applied to said light emitting device during at least part of the time said burst digital data signals are transmitted but said drive current is not applied to said light emitting device during at least most of the time between bursts of said burst digital data signal, which reduces residual light in said fiber optic communications system and noise resulting therefrom;
   first memory means coupled to said controllable drive current source for storing said magnitude control signal and for applying said magnitude control signal to said magnitude input terminal, said first memory means including word input terminals and also including a write control input terminal to which a write control word may be applied for causing said first memory means to store a new magnitude control signal applied to said word input terminals;
   photoelectric conversion means coupled to said light emitting device for generating a photoelectic signal representative of the light output of said light emitting device;
   control signal processing means coupled to said photoelectric means for comparing said photoelectric signal with a reference signal representative of a desired light output from said light emitting device, and for generating said new magnitude control signal; and
   timing means coupled to said enable control signal generating means, to said control signal processing means and to said write control input terminal and word input terminals of said first memory means for generating said write control word and for storing said new magnitude control signal in said first memory means at a time other than said time during which said enable control signal causes drive current to be applied to said light emitting device, whereby said magnitude control signal is not updated during said burst signals and said burst signals are not perturbed.

2. A circuit according to claim 1 in which said light emitting device is a laser diode.

3. A circuit according to claim 2 in which said controllable drive current source comprises:
   digitally controllable current generating means responsive to said magnitude signal for generating said drive current at an output terminal; and
   switching means coupled to said output terminal of said digitally controllable current generating means, to said laser diode and to said enable control signal generating means for coupling said drive current from said digitally controllable current generating means to said laser diode under control of said enable control signal.

4. A circuit according to claim 3 wherein said controllable drive current source generates a bias current corresponding to said knee point in response to said magnitude control signal, and said enable control signal enables said controllable drive current source continously during said enabled interval.

5. A circuit according to claim 3 wherein said controllable drive current source generates a modulating current in response to said magnitude control signal, and said enable control signal is pulsed during said enabled interval in response to the logic level of said digital data.

6. A circuit according to claim 1 wherein said photoelectric conversion means comprises:
   a photoelectric conversion device coupled to said light emitting device for generating an analog light-representative signal representative of the light output of said light emitting device;
   sample-and-hold means coupled to said photoelectric conversion device for sampling said analog light-representative signal and thereafter switching to a holding mode to form a sampled analog photoelectric signal, said sampled photoelectric signal drifting with time as a result of leakage of said sample-and-hold means;
   analog-to-digital conversion means coupled to said sample-and-hold means for converting said sampled analog photoelectric signal into a digital photoelectric signal; and
   second memory means coupled to said analog-to-digital conversion means for storing said digital photoelectric signal to form said photoelectric signal.

7. A circuit according to claim 6 wherein said second memory means comprises means for storing said digital photoelectric signal at a time fixed in relation to said time at which said sample-and-hold means switches to said holding mode to thereby allow time for said analog-to-digital conversion means to settle before storing said digital photoelectric signal to form said photoelectric signal.

8. A method for adjusting the drive current of a light emitting device of a burst data transmitter, comprising the steps of:
controlling the application of drive current to a light emitting device by means of an enable control signal;
storing a magnitude control signal in a first digital memory to form a stored magnitude signal;
controlling the magnitude of said drive current by means of said stored magnitude control signal;
receiving signal from at least a source of data to produce signal to be transmitted;
generating said enable control signal in response to said signal to be transmitted for applying said drive current to said light emitting device for at least portions of a burst interval during which said signal to be transmitted is transmitted in the form of light output;
converting a portion of said light output of said light emitting device into a photoelectric signal;
processing said photoelectric signal to generate a new magnitude signal; and
overwriting said new magnitude signal into said first digital memory at times other than during said burst interval to form said stored magnitude signal.

9. A method according to claim 8 wherein said step of controlling the application of a drive current includes the steps of:
controlling the application of a bias current to said light emitting device; and
said step of generating said enable control signal includes the step of maintaining said bias current constant for the duration of said burst interval.

10. A method according to claim 8 wherein said step of controlling the application of a current include the step of controlling the application of modulating current to said light emitting device; and
said step of generating said enable control signal includes the step of generating said enable control signal in response to a logic level of said accumulated signal, whereby modulating current is applied to said light emitting device only during a particular logic level of said accumulated signal.

11. A fiber optic communications system including a plurality of nodes interconnected by fiber optic cables, comprising:
at least first and second data transmitters located at separate nodes of said systems, each of said first and second data transmitter being adapted for burst communications by means of light produced by a current driven light emitting device and coupled into said fiber optic cables, each said light emitting device having a light-versus-drive-current characteristic including a first portion in which the light emitted as a function of drive current increases relatively slowly from zero to a first intensity which occurs at a knee point, and also including a second portion in which the light emitted as a function of drive current increases relatively quickly for drive currents exceeding the drive current corresponding to said knee point, said characteristics changing with time in an uncontrolled manner;
a first controllable drive current source ooupled to said light emitting device of said first data transmitter for applying drive current thereto, said first controllable drive current source being enabled in response to a first bias enable control signal and a first modulation enable control signal applied to bias and modulation enable input terminals, repectively, for supplying bias current and modulation current to said light emitting device of said first data transmitter with magnitudes controlled by first bias magnitude control signals and first modulation magnitude control signals, respectively, applied to a bias magnitude input terminal and to a modulation magnitude input terminal, respectively;
a second controllable drive current source coupled to said light emitting device of said second data transmitter for applying drive current thereto, said second controllable drive current source being enabled in response to a second bias enable control signal and a second modulation enable control signal applied to bias and modulation enable input terminals, respectively, for supplying bias current and modulation current to said light emitting device of said second data transmitter with magnitudes controlled by second bias magnitude control signals and second modulation magnitude control signals, respectively, applied to a bias magnitude input terminal and to a modulation magnitude input terminal, respectively;
a first source of burst digital data to be transmitted by said first data transmitter, said burst digital data including logic high and logic low levels, and also including information relating to time division multiple access mutual synchronization;
a second source of burst digital data to be transmitted by said second data transmitter, said burst digital data including logic high and logic low levels, and also including information relating to time division multiple access mutual synchronization;
at least one data receiver coupled to said fiber optic cables for receiving data from said first and second sources of burst digital data;
first enable control signal generating means coupled to said first source of burst digital data and to said first controllable drive current source for generating said first bias enable control signal during a first enabled interval at least equal to the duration of said burst digital data from said first source of burst digital data and for applying said first bias enable control signal to said bias enable input terminal of said first controllable drive current source, and for generating said first modulation enable control signal during said logic high levels of said burst digital data from said first source of burst digital data and for applying said first modulation enable control signal to said modulation enable input terminal of said first controllable drive current source;
second enable control signal generating means coupled to said second source of burst digital data and to said second controllable drive current source for generating said second bias enable control signal during a second enabled interval at least equal to the duration of said burst digital data from said second soure of burst digital data and for applying said second bias enable control signal to said bias enable input terminal of said second controllable drive current source, and for generating said second modulation enable control signal during said logic high levels of said burst digital data from said second source of burst digital data and for applying said second modulation enable control signal to said modulation enable input terminal of said second controllable drive current source, whereby said bias current is not applied to said light emitting device of said first data transmitter during the time during which said light emitting device of said second data transmitter is transmitting, thereby reducing the noise received by said data receiver during reception of transmissions from said second data transmitter;

first memory means coupled to said first controllable drive current source for storing said first bias magnitude control signal and said first modulation magnitude control signal and for applying said first bias magnitude control signal and said first modulation magnitude control signal to said bias and modulation magnitude input terminals, respectively, of said first controllable drive current source, said first memory means including bias magnitude word input terminals, modulation magnitude word input terminals, a bias write control input terminal and a modulation write control input terminal for causing said memory to controllably store one of a new bias magnitude control signal and a new modulation magnitude control signal, respectively, applied at their respective word input terminals;

photoelectric conversion means coupled to said light emitting device of said first data transmitter for generating a photoelectric signal representative of the light output of said light emitting device;

control signal processing means coupled to said photoelectric conversion means for comparing said photoelectric signal with a reference signal selected to represent a desired light output from said light emitting device for generating a new magnitude control signal; and timing and control means coupled to said control signal processing means, to said first source of burst digital data, to said bias and modulation magnitude word input terminal, to said bias write control input terminal and said modulation write control input terminal of said first memory means for loading said new magnitude control signal into said first memory means in response to generation of said photoelectric signal generated when said first enable control signal generating means generates only said first bias enable control signal and not said first modulation enable control signal to form said first bias magnitude control signal, and for loading said new magnitude control signal into said first memory means in response to generation of said photoelectric signal generated when said first enable control signal generating means generates both said first bias enable control signal and said first modulation enable control signal to form said first modulation magnitude control signal, said loading of said new magnitude control signal into said first memory means occurring at a time other than said time during said first enabled interval.

12. A fiber-optic data transmitter adapted for transmitting burst data from a source of burst data, comprising:

a laser diode having light-output-versus-drive current characteristics which change with time, thereby requiring adjustment of the magnitude of said drive current;

drive current generating means coupled to said laser diode and adapted to be coupled to said source of burst data for energizing said laser diode with drive current in response to said burst data to be transmitted, the magnitude of said drive current being established by a magnitude word applied to a magnitude input terminal;

a controllable memory coupled to said drive current generating means for storing said magnitude word and for continuously applying the stored magnitude word to said magnitude input terminal;

magnitude word update means coupled to said laser diode, to said source of burst data, to said drive current generating means and to said memory for, during a time synchronized with at least a portion of said bursts of data, enabling said drive current generating means, comparing the light output of said laser diode with a reference, and generating an updated magnitude word; and update timing control means coupled to said source of burst data, to said magnitude word update means and to said memory means for enabling said memory means for storing said updated magnitude word only during an interval in which said drive current generating means is not enabled.

* * * * *

UNITED STATES PATENT AND TRADEMARK OFFICE
CERTIFICATE OF CORRECTION

PATENT NO. : 4,718,118

DATED : January 5, 1988

INVENTOR(S) : Jeffrey Paul Viola

It is certified that error appears in the above-identified patent and that said Letters Patent is hereby corrected as shown below:

Column 17, line 43, after "application of a" insert --drive--.

Column 17, line 43, "include" should be --includes--.

Column 17, line 56, "systems," should be --system,--.

Column 18, line 3, "ooupled" should be --coupled--.

Column 19, line 44, "terminal," should be --terminals,--.

Under REFERENCES CITED "4,612,617" should be --4,612,671--.

Signed and Sealed this

Twenty-first Day of June, 1988

*Attest:*

DONALD J. QUIGG

*Attesting Officer*  *Commissioner of Patents and Trademarks*